(12) United States Patent
Trevisan et al.

(10) Patent No.: US 10,320,017 B2
(45) Date of Patent: Jun. 11, 2019

(54) SORBENT BED ASSEMBLY AND FUEL CELL SYSTEM INCLUDING SAME

(71) Applicant: BLOOM ENERGY CORPORATION, Sunnyvale, CA (US)

(72) Inventors: David Trevisan, San Jose, CA (US); Abraham Bruno Caulk, San Jose, CA (US); Emma Campbell, Palo Alto, CA (US); Chad Pearson, Mountain View, CA (US); Arne Ballantine, Palo Alto, CA (US); Jessica Mahler, Mountain View, CA (US); Venkat Ramani, Milpitas, CA (US); Gilbert Richards, Santa Clara, CA (US); Christian Daco, Fremont, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 341 days.

(21) Appl. No.: 15/283,964

(22) Filed: Oct. 3, 2016

(65) Prior Publication Data

US 2017/0098842 A1    Apr. 6, 2017

Related U.S. Application Data

(60) Provisional application No. 62/237,711, filed on Oct. 6, 2015.

(51) Int. Cl.
*H01M 8/0662* (2016.01)
*H01M 4/06* (2006.01)

(52) U.S. Cl.
CPC ........... *H01M 8/0662* (2013.01); *H01M 4/06* (2013.01)

(58) Field of Classification Search
CPC .............................. H01M 8/0062; H01M 4/06
See application file for complete search history.

(56) References Cited

U.S. PATENT DOCUMENTS

| | | | |
|---|---|---|---|
| 6,429,019 | B1 | 8/2002 | Goldstein et al. |
| 7,067,208 | B2 | 6/2006 | Gottmann et al. |
| 7,422,810 | B2 | 9/2008 | Venkataraman et al. |
| 7,713,649 | B2 | 5/2010 | Hickey et al. |

(Continued)

FOREIGN PATENT DOCUMENTS

| | | |
|---|---|---|
| CA | 2653441 A1 | 1/2008 |
| EP | 0817298 A1 | 1/1998 |

OTHER PUBLICATIONS

International Search Report and Written Opinion, International Application No. PCT/US2015/010137; dated Apr. 30, 2015.

(Continued)

*Primary Examiner* — Helen Oi K Conley
(74) *Attorney, Agent, or Firm* — The Marbury Law Group PLLC

(57) ABSTRACT

A sorbent bed assembly, a fuel cell system including the sorbent bed assembly, and methods of using the same. The sorbent bed assembly includes sorbent beds disposed in a stack, such that the sorbent beds extend lengthwise in a non-vertical direction, and conduits configured to fluidly connect the sorbent beds. One or more of the sorbent beds may also include a housing, a removable cartridge disposed in the housing and comprising a sorbent material configured to purify the fuel, and a support configured to prevent the fuel from bypassing the cartridge when the fuel flows through the housing.

4 Claims, 12 Drawing Sheets

(56) References Cited

U.S. PATENT DOCUMENTS

| | | |
|---|---|---|
| 8,440,362 B2 | 5/2013 | Richards et al. |
| 8,535,836 B2 | 9/2013 | Ballantine et al. |
| 8,652,697 B2 | 2/2014 | Gottmann et al. |
| 9,190,693 B2 | 11/2015 | Sridhar et al. |
| 2003/0113598 A1 | 6/2003 | Chow et al. |
| 2004/0202908 A1 | 10/2004 | Schmitz et al. |
| 2006/0188763 A1 | 8/2006 | Bai et al. |
| 2007/0017367 A1* | 1/2007 | McElroy ............. B01D 53/053 95/90 |
| 2007/0017368 A1* | 1/2007 | Levan ................ B01D 53/047 95/96 |
| 2007/0017369 A1* | 1/2007 | LeVan ................ B01D 53/047 95/96 |
| 2007/0196704 A1 | 8/2007 | Valensa et al. |
| 2007/0224472 A1 | 9/2007 | Fujita et al. |
| 2008/0096087 A1 | 4/2008 | Kulakov |
| 2008/0213141 A1 | 9/2008 | Pinchot |
| 2008/0289496 A1 | 11/2008 | Poshusta et al. |
| 2009/0029208 A1 | 1/2009 | Katikaneni et al. |
| 2009/0197296 A1 | 8/2009 | Martin et al. |
| 2010/0216628 A1 | 8/2010 | Vanderspurt et al. |
| 2011/0281185 A1 | 11/2011 | Sridhar et al. |
| 2014/0004433 A1 | 1/2014 | Ballantine et al. |
| 2015/0194685 A1 | 7/2015 | Ballantine et al. |

OTHER PUBLICATIONS

International Search Report & Written Opinion, International Application No. PCT/US2010/041238, dated Mar. 2, 2011.
International Preliminary Report on Patentability, International Application No. PCT/US2010/041238, dated Jan. 19, 2012.

\* cited by examiner

SORBENT BED ASSEMBLY AND FUEL CELL SYSTEM INCLUDING SAME

FIELD

Aspects of the present invention provide a sorbent bed assembly, a fuel cell system including the sorbent bed assembly, and systems and devices for loading and/or transporting sorbent bed assemblies.

BACKGROUND

The reliability of fuel cell systems, such as a solid oxide fuel cell (SOFC) system, greatly depends on the presence and concentration of undesirable constituents in the fuel stream. Undesirable constituents, such as moisture, oxygen, siloxanes, and sulfur (including sulfur compounds), may degrade the fuel cell stack's performance and cause irreversible damage resulting in decrease efficiencies and costly replacement. Specifically, when using natural gas as a fuel, fuel cell systems require desulfurization. Passing fuel through desulfurizer sorbent beds is one way to remove sulfur and sulfur compounds from fuel prior to use in a fuel cell.

However, the sorbent beds (e.g., absorbent and/or adsorbent beds) have a finite life and once the sorbent bed is exhausted, sulfur may pass through the sorbent bed without being adsorbed and reach the fuel cell stack, causing permanent damage. Even if sorbent beds are replaced prior to exhaustion, there may be underutilized portions of the sorbent bed increasing the cost of sorbent bed replacement. Additionally, other undesirable constituents not filtered by the desulfurizer sorbent beds may cause damage to the fuel cell stack, shortening its operational life.

In addition, general sorbent beds include large vessels to contain loose sorbent material. The vessels are oriented vertically, and a gas is fed through either the top or bottom of the vessel, in order to assure proper dispersion of a gas through the sorbent material. Accordingly, in order to replace the sorbent material, the entire vessel must be disconnected and removed, which is a difficult and time consuming process.

SUMMARY

Exemplary embodiments of the present disclosure provide a sorbent bed assembly (SBA) of a fuel cell system, the sorbent bed assembly comprising: sorbent beds configured to purify a fuel, the sorbent beds being disposed in a stack, such that the sorbent beds extend lengthwise, in a non-vertical direction; and conduits fluidly connecting the sorbent beds to one another.

Exemplary embodiments of the present disclosure provide and SBA that includes one or more of the sorbent beds may also include a housing, a removable cartridge disposed in the housing and comprising a sorbent material configured to purify the fuel, and a support configured to prevent the fuel from bypassing the cartridge when the fuel flows through the housing.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 1:
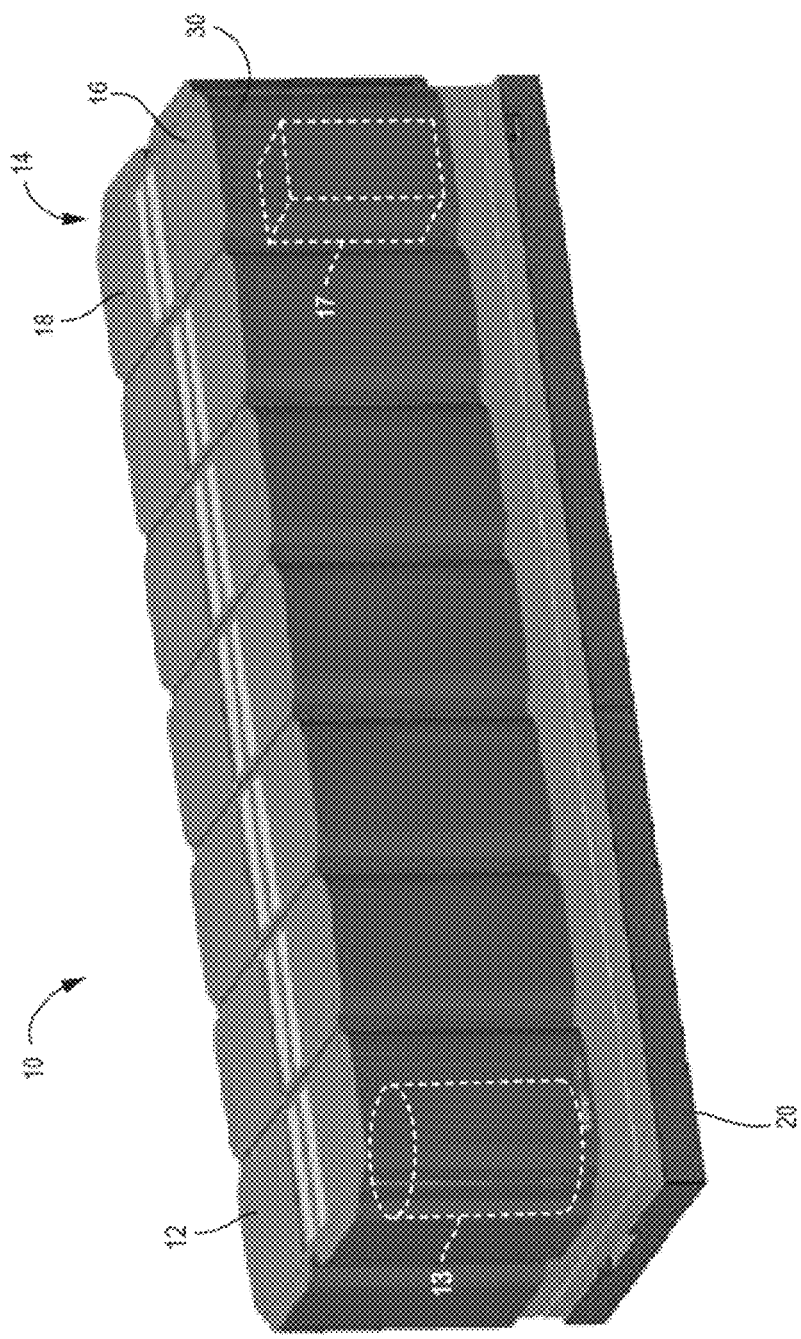
FIG. 1 is a perspective view of a fuel cell system according to various embodiments of the present disclosure.

Referring to FIG. 1, a modular fuel cell system 10 is shown according to an exemplary embodiment. The system 10 may contain modules and components described in U.S. patent application Ser. No. 11/656,006, filed on Jan. 22, 2007, and incorporated herein by reference in its entirety. The modular design of the enclosure of the fuel cell system 10 provides flexible system installation and operation. Modules allow scaling of installed generating capacity, reliable generation of power, flexibility of fuel processing, and flexibility of power output voltages and frequencies with a single design set. The modular design results in an "always on" unit with very high availability and reliability. This design also provides an easy means of scale up and meets specific requirements of customer's installations. The modular design also allows the use of available fuels and required voltages and frequencies which may vary by customer and/or by geographic region.

The system 10 includes power modules 12, a fuel processing module 16, and power conditioning (i.e., electrical output) modules 18. In various embodiments, the power conditioning modules 18 are configured to deliver direct current (DC). In alternative embodiments, the power conditioning modules 18 are configured to deliver alternating current (AC). In these embodiments, the power condition modules 18 include a mechanism to convert DC to AC, such as an inverter. For example, the system enclosure may include any desired number of modules, such as 2-30 power modules, for example 3-12 power modules, such as 6-12 modules. FIG. 1 illustrates a system 10 containing six power modules 12 (one row of six modules stacked side to side), one fuel processing module 16, and one power conditioning module 18 on a common base 20. Each module 12, 16, 18 may comprise its own cabinet. Alternatively, as will be described in more detail below, modules 16 and 18 may be combined into a single input/output module 14 located in one cabinet. While one row of power modules 12 is shown, the system may comprise more than one row of modules 12. For example, the system may comprise two rows of power modules arranged back to back/end to end.

Each power module 12 is configured to house one or more hot boxes 13. Each hot box contains one or more stacks or columns of fuel cells (not shown for clarity), such as one or more stacks or columns of solid oxide fuel cells having a ceramic oxide electrolyte separated by conductive interconnect plates. Other fuel cell types, such as PEM, molten carbonate, phosphoric acid, etc. may also be used.

The fuel cell stacks may comprise externally and/or internally manifolded stacks. For example, the stacks may be internally manifolded for fuel and air with fuel and air risers extending through openings in the fuel cell layers and/or in the interconnect plates between the fuel cells.

Alternatively, the fuel cell stacks may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

The fuel processor 17 is disposed in a cabinet of the fuel processing module 16 and includes sorbent bed assemblies (see FIG. 2A) that include desulfurizer and/or other impurity adsorption beds. The fuel processor 17 may be accessed by a door 30 of the cabinet. The fuel processing module 16 may be designed to process different types of fuel. For example, a diesel fuel processing module, a natural gas fuel processing module, and an ethanol fuel processing module may be provided in the same or in separate cabinets. A different bed composition tailored for a particular fuel may be provided in each module. The fuel processing module 16 may process at least one of the following fuels selected from natural gas provided from a pipeline, compressed natural gas, methane, propane, liquid petroleum gas, gasoline, diesel, home heating oil, kerosene, JP-5, JP-8, aviation fuel, hydrogen, ammonia, ethanol, methanol, syn-gas, bio-gas, bio-diesel and other suitable hydrocarbon or hydrogen containing fuels.

The fuel processor 17 is configured to reduce a fuel cell stack's exposure to undesirable constituents. The fuel processor 17 may include components for detecting the undesirable constituent downstream from a given sorbent bed, which indicates a breakthrough event (i.e., bed exhaustion). Once a breakthrough event is detected, a reserve capacity sorbent bed may be used to prevent more undesirable constituent from reaching the fuel cell stack (i.e., power generation module). Specifically, control systems may change the operation of the fuel cell system by altering fuel flow, utilizing a reserve sorbent bed, powering portions of the fuel cell system on/off, selecting different fuel sources, etc.

Additionally, a detection system may enable detection of undesirable constituents such as siloxanes, moisture, oxygen, sulfur (including sulfur compounds such as organosulfur compounds), and other fuel cell stack poisons. Sending data representative of undesirable constituent types to a database may be used to create an undesirable constituent map. Process controls may access the undesirable constituent type data and the undesirable constituent map to alter operations such as fuel flow, fuel source selection, and power to various portions of the fuel cell system. These alterations to the fuel cell system operation may prevent or reduce the exposure of fuel cell stack to the undesirable constituents the thereby improving efficiency and the operational life of fuel cell stack.

Conventionally, each sorbent bed is serviced as an individual part, and each sorbent bed is filled with the same sorbent materials to purify a fuel. Monitoring each sorbent bed may be difficult, as each sorbent bed needs to be accessible for service. In addition, mistakes may be made when replacing the individual sorbent beds and reconnecting fuel hoses.

The present inventors discovered that, in a fuel cell system, sorbent beds for sulfur removal (and absorption and/or adsorption) may become exhausted, allowing sulfur into the fuel cell stack (i.e., power generation module), causing irreversible damage to the stack. Although sorbent beds may be periodically replaced prior to exhaustion based on calendar estimations, changes in fuel sources or other variables that may alter sorbent bed exhaustion. Degradation of fuel cell performance may indicate that a primary sorbent bed is exhausted. Alternatively, undesirable constituent detectors downstream from a sorbent bed may also help determine when a sorbent bed is exhausted indicating that the sorbent bed needs to be serviced, thereby reducing a fuel cell stack's exposure to the undesirable constituents.

Traditional fuel processors use two sorbent beds connected in series. After a scheduled period or a determination that one sorbent bed is exhausted, both sorbent beds are replaced. This leads to under utilization of one or both sorbent beds and wasted cost in replacing them. Thus, detecting bed exhaustion may provide added cost benefits to a fuel cell system by fully using each sorbent bed in a sorbent bed assembly (i.e., fuel processing module).

According to various embodiments, the present inventors have provided a fuel processor that includes two or more sorbent bed assemblies disposed in fluid communication with a fuel source. Each sorbent bed assembly includes multiple sorbent beds disposed in fluid communication with one another. One or more of the sorbent beds may be filled with different sorbent materials, based on the composition of a site fuel. As such, the capacity and service life of a fuel processor may be increased.

In addition, one sorbent bed assembly, which may be an exhausted sorbent bed assembly, may be isolated, while another sorbent bed remains in operation. As such, the fuel cell system may remain in operation when a sorbent bed is serviced. Further, the use of a sorbent bed assembly simplifies maintenance, since such a configuration does not require the servicing of individual sorbent beds.

Sorbent bed exhaustion may be detected based on degradation of the fuel cell stack (i.e., power generation module) performance. Detection of degradation of fuel cell stack performance may include comparing the amount of fuel used by the fuel cell stack with the electrical potential difference (voltage) output of the fuel cell stack and/or monitoring a stack performance characteristic, such as fuel utilization, output power, etc. If the voltage output for a fuel cell stack drops below a threshold value (e.g., at least a 5% decrease in voltage) for a given fuel flow rate, then the fuel cell stack may detect that there is significant degradation, likely due to the fuel cell stack receiving undesirable constituents present in the fuel stream. A separate detector, such as a color change detector, electrical resistance detector, or an artificial nose, may detect bed exhaustion or additional undesirable constituents not filtered by the sorbent beds. These types of detection mechanisms may signal (e.g., directly or via a central controller) valves to divert flow from an exhausted bed to a non-exhausted bed, switch fuel sources, reduce fuel flow to the fuel cell stack, or stop fuel flow to the fuel cell stack to prevent damage to the fuel cell stack. Additionally, detectors, such as color change detectors, may send undesirable constituent data based on the color change to a color change database to create a color change map. Controls from the fuel cell system may alter the fuel cell system (e.g., divert fuel to a reserve sorbent bed, shut down the fuel cell stack, etc.), based on the undesirable constituent map and undesirable constituents currently detected.

Figure 2A:
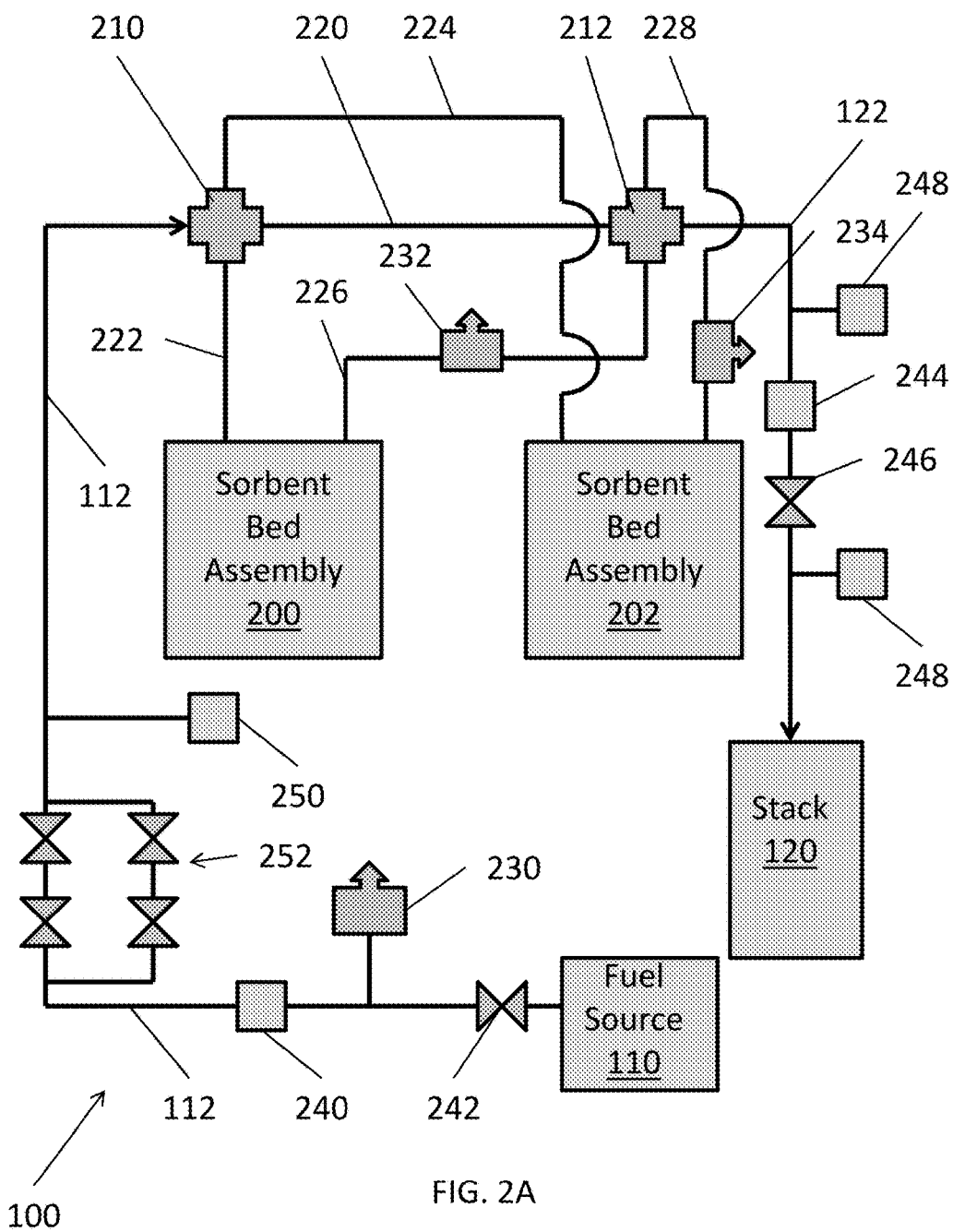
FIG. 2A is a schematic views of a fuel processor according to various embodiments of the present disclosure.

FIG. 2A illustrates a schematic view of a fuel processor 100, according to various embodiments of the present disclosure. Referring to FIG. 2A, the fuel processor 100 includes a first sorbent bed assembly 200 (first SBA), a second sorbent bed assembly 202 (second SBA), a first valve 210, and a second valve 212. The SBAs 200, 202 may include one or more fluidly connected sorbent beds. The first and second valves 210, 212 may be manual or automatic four-way valves. In particular, each valve 210, 212 may include 4 openings, which may operate as inlets and/or outlets.

The fuel processor 100 may be disposed in fluid communication with a fuel source 110 and one or more power modules, such as a fuel cell or a fuel cell stack 120. The fuel source 110 may be a fuel tank or a fuel pipeline. The fuel source 110 may include least one fuel selected from natural gas, compressed natural gas, methane, propane, liquid petroleum gas, gasoline, diesel, home heating oil, kerosene, JP-5, JP-8, aviation fuel, hydrogen, ammonia, ethanol, methanol, syn-gas, bio-gas, bio-diesel and other suitable hydrocarbon or hydrogen-containing fuels.

The fuel source 110 may be connected to the first valve 210 by a fuel source conduit 112. The stack 120 may be connected to the second valve 212 by a stack conduit 122. The first and second valves 210, 212 may be connected by a valve conduit 220. The first valve 210 may be connected to an inlet of the first SBA 200 by a first inlet conduit 222. The second valve 212 may be connected to an inlet of the second SBA 202 by a second inlet conduit 224. The second valve 212 may be connected to an outlet of the first SBA 200 by a first outlet conduit 226. The second valve 212 may be connected to an outlet of the second SBA 202 by a second outlet conduit 228.

The fuel processor 100 may also include a system purge valve 230, a first purge valve 232, and a second purge valve 234. The system purge valve 230 may be disposed on the fuel source conduit 112. The fuel processor 100 may include a first filter 240 and a fuel source valve 242 disposed on the fuel source conduit 112. The fuel processor 100 may include a second filter 244 and a stack valve 246 disposed on the stack conduit 122. The fuel processor 100 may include bypass connectors 248 disposed in fluid communication with the stack conduit 122. The fuel processor 100 may include a burst detector 250 disposed in fluid communication with the fuel source conduit 112. The fuel processor 100 may include a valve assembly 252 disposed in fluid communication with the fuel source conduit 112.

Figure 2B:
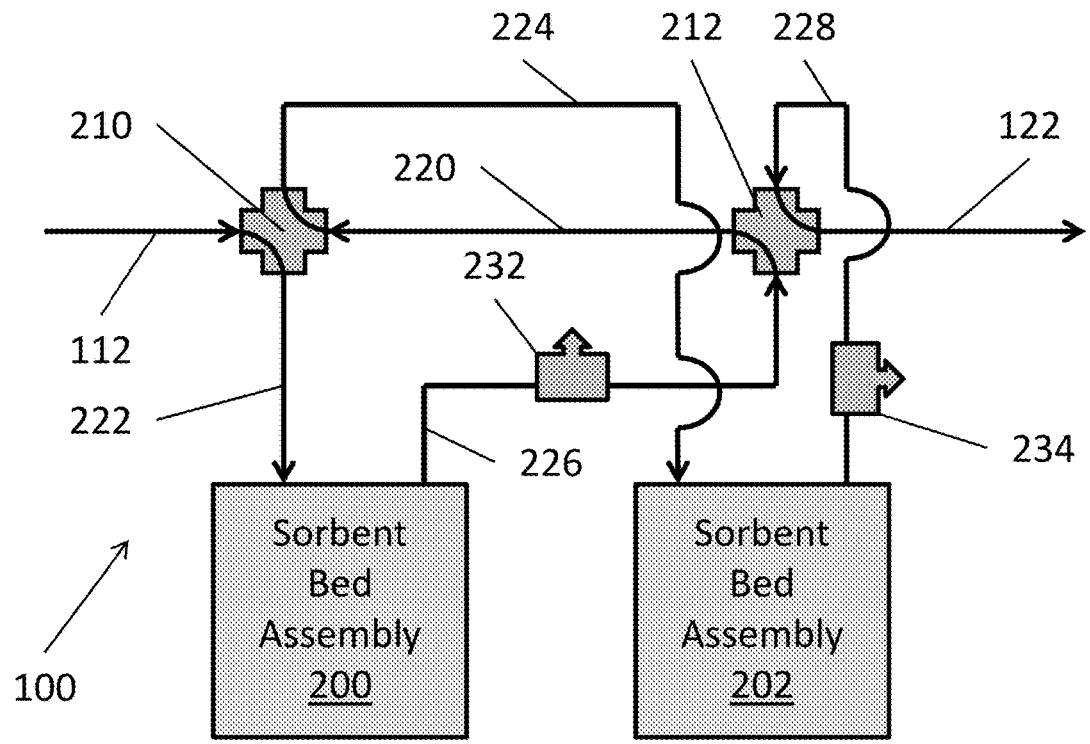
FIGS. 2B-2E are schematic views of flow path configurations of the fuel processor of FIG. 2A, according to various embodiments of the present disclosure.

FIGS. 2B-2E are schematic views showing different flow path configurations of the fuel processor 100 and a corresponding method of operating the same. Referring to FIG. 2B, the fuel processor 100 is shown in a first flow configuration, wherein fuel flows from the fuel source conduit 112, through the first SBA 200, and then through the second SBA 202, before entering the stack conduit 122. In particular, in the first flow configuration, the first and second valves 210, 212 are both disposed in a first position.

When in the first position, the first valve 210 directs fuel received from the fuel source conduit 112 to the first SBA 200, via the first inlet conduit 222. The first valve 210 also directs fuel received from the valve conduit 220 to the second SBA 202, via the second inlet conduit 224.

When in the first position, the second valve 212 directs fuel received from the first SBA 200, via the first outlet conduit 226, to the first valve 210, via the valve conduit 220. The second valve 212 also directs fuel received from the second SBA 202, via the second outlet conduit 228, to the stack conduit 122.

Figure 2C:
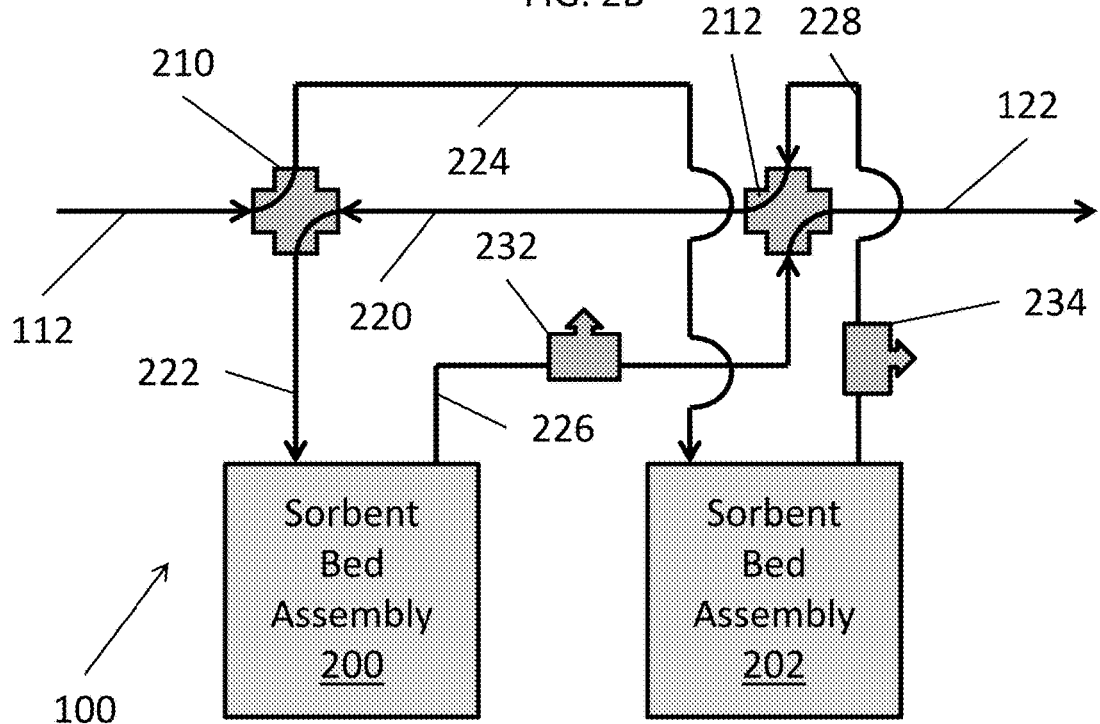

Referring to FIG. 2C, the fuel processor 100 is shown in a second flow configuration, wherein fuel flows from the fuel source conduit 112, through the second SBA 202, and then through the first SBA 200, before entering the stack conduit 122. In particular, in the first flow configuration, the first and second valves 210, 212 are both disposed in a second position.

When in the second position, the first valve 210 directs fuel received from the fuel source conduit 112 to the second SBA 202, via the second inlet conduit 224. The first valve 210 also directs fuel received from the valve conduit 220 to the first SBA 200, via the first inlet conduit 222.

When in the second position, the second valve 212 directs fuel received from the second SBA 202, via the second outlet conduit 228, to the first valve 210, via the valve conduit 220. The second valve 212 also directs fuel received from the first SBA 200, via the first outlet conduit 226, to the stack conduit 122.

Accordingly, the first and second flow configurations operate to change the sequence in which the fuel flows through the first and second SBAs 200, 202. This allows for more complete usage of the sorbent materials in the first and second SBAs 200, 202. For example, in the first flow configuration, the first SBA 200 may become exhausted before the second SBA 202. As such, the second flow configuration may be applied, such that the second SBA 202 may be more completely utilized prior to servicing.

Figure 2D:
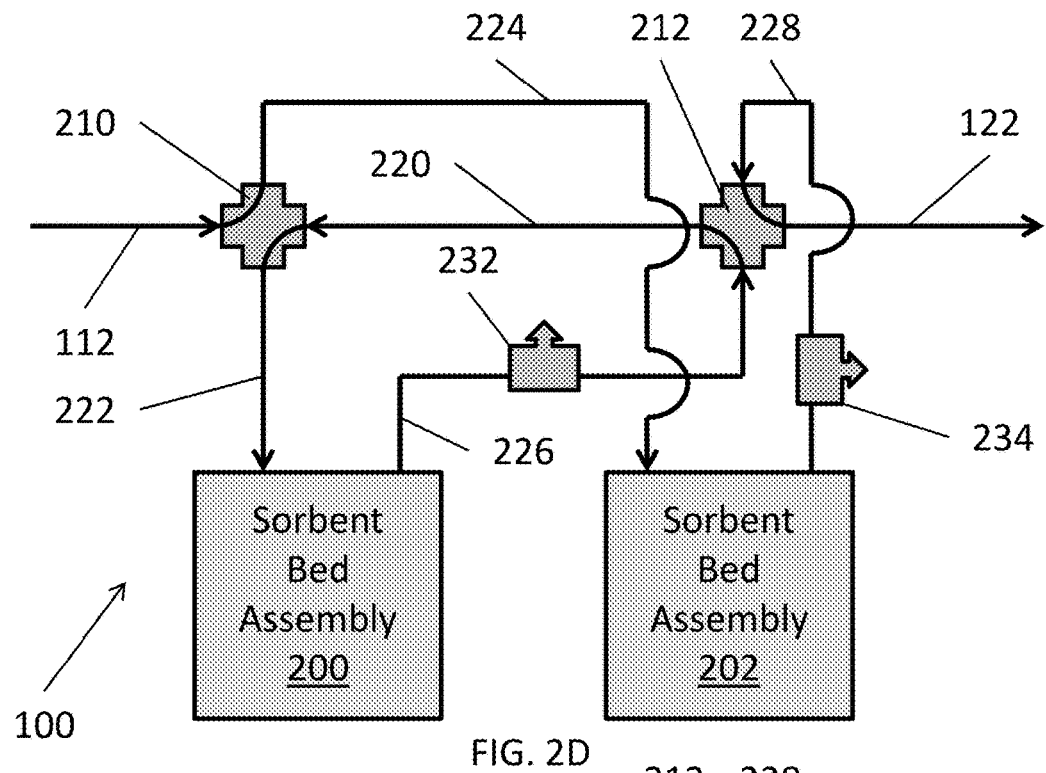

Referring to FIG. 2D, the fuel processor 100 is shown in a third flow configuration, wherein fuel flows from the fuel source conduit 112 and through the second SBA 202, before entering the stack conduit 122, without entering the first SBA 200. In particular, in the third flow configuration, the first valve 210 is disposed in the second position and the second valve 212 is disposed in the first position.

Accordingly, the first SBA 200 may be isolated from the fuel flowing through the fuel processor 100. The first purge valve 232 may be opened to depressurize the first SBA 200. The first SBA 200 may then be serviced (e.g., a sorbent material thereof may be replaced), while the fuel processor 100 remains in operation using the second SBA 202. In particular, the sorbent material of one or more sorbent beds included in the first SBA 200 may be replaced by removing a cartridge containing the sorbent material and then inserting a fresh cartridge. Such cartridges are discussed in detail below.

Figure 2E:
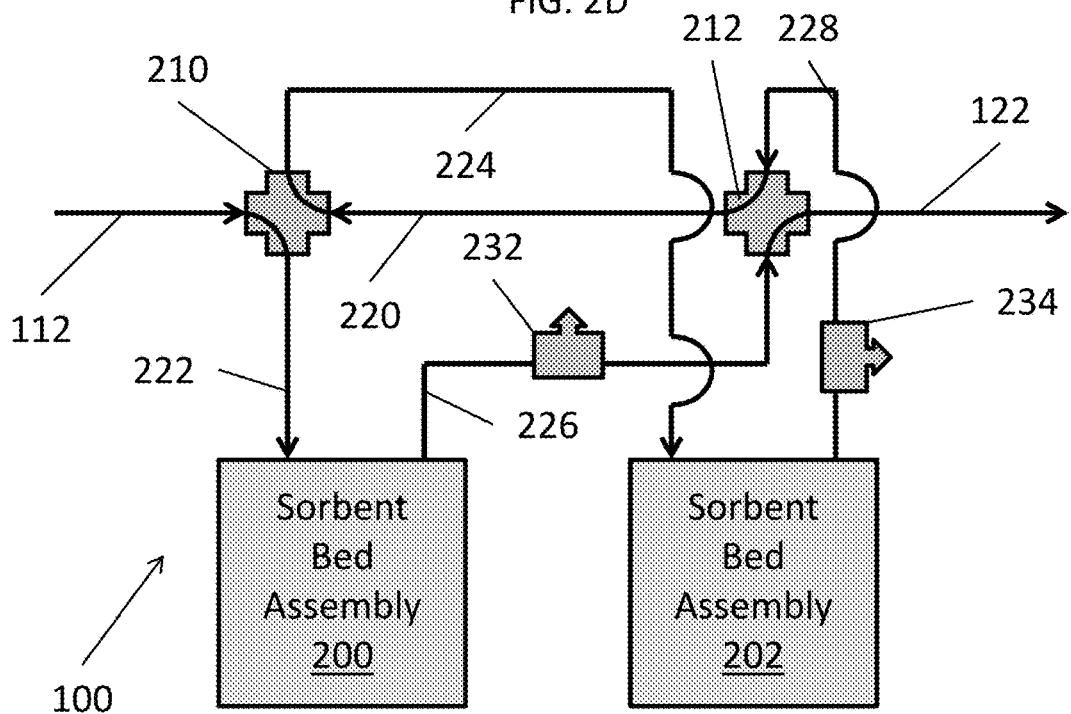

Referring to FIG. 2E, the fuel processor 100 is shown in a fourth flow configuration, wherein fuel flows from the fuel source conduit 112 and through the first SBA 200, before entering the stack conduit 122, without entering the second SBA 202. In particular, in the third flow configuration, the first valve 210 is disposed in the first position and the second valve 212 is disposed in the second position.

Accordingly, the second SBA 202 may be isolated from the fuel flowing through the fuel processor 100. The second purge valve 234 may be opened to depressurize the second SBA 202. The second SBA 202 may then be serviced, while the fuel processor 100 remains in operation using the first SBA 200. For example, the sorbent material of one or more sorbent beds included in the second SBA 202 may be replaced by replacing a cartridge, as discussed in detail below.

Figure 3A:
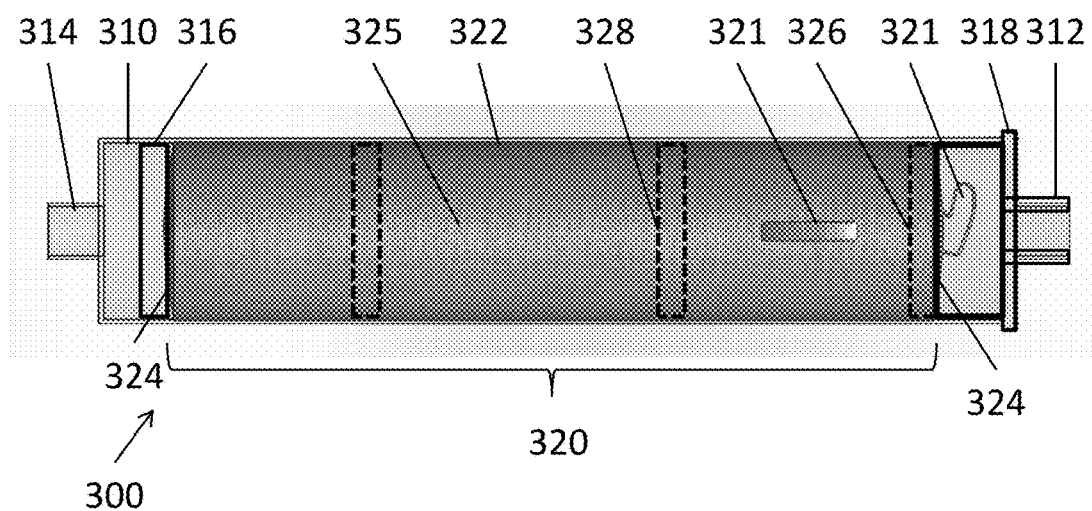
FIG. 3A-3D are top plan views of sorbent beds according to various embodiments of the present disclosure.

FIG. 3A is a sectional view of a sorbent bed 300, according to various embodiments of the present disclosure. Referring to FIG. 3A, the sorbent bed 300 has a non-vertical configuration (e.g., the sorbent bed 300 extends lengthwise in a horizontal direction). In other words, the major axis of the sorbent bed 300 may extend at an angle ranging from about 0° to about 45° with respect to horizontal/the ground.

The sorbent bed 300 includes a housing 310, a first opening 312, an opposing second opening 314, a retainer 316, a cover 318, and a removable cartridge 320 disposed in the housing 310 and filled with a sorbent material 325. The sorbent material 325 may be a desulfurization material, (e.g., a zeolite material or the like). The composition of the sorbent material 325 may be configured according to the type of fuel to be purified. The sorbent material 325 may be in the form of particles, such as generally spherical or ovoid particles. The particles may have a narrow average particle size distribution, in order to reduce particle size segregation, which may be exacerbated by the horizontal orientation of the sorbent bed 300.

In some embodiments, the particles of the sorbent material 325 may be shaped to increase the packing density of the particles. For example, the particles may be in the form of geodesic spheres, or the like, or may be non-spherical, which may reduce a void space between the particles.

For purposes of convenience, the first and second openings 312, 314 may be respectively referred to as an inlet and an outlet. However, either opening 312, 314 may operate as an inlet or an outlet, according to a fuel flow direction through the housing 310 (e.g. along the lengthwise (major) axis extending from the first opening 312 to the second opening 314. The sorbent bed 300 may be configured such that a fluid (e.g. a fuel) flows into the housing 310 through the first opening 312, through the cartridge 320 (e.g., through the sorbent material 325), and then exits the housing 310 through the second opening 314.

The housing 310 may be cylindrical and may be formed of metal or another impermeable material. The cover 318 may be removed from the housing 310, such that the cartridge 320 may be inserted therein. The retainer 316 may be configured to prevent the cartridge 320 from reaching the second opening 314. The retainer 316 may be annular or may be disk-shaped. When the retainer 316 is disk-shaped, the retainer 316 may be permeable, such that fuel can flow there through. For example, the retainer 316 may be in the form of a screen or mesh, or may include through-holes.

The cover 318 may be detachable from the housing 310. The cover 318 may extend into the housing 310, such that when the cover 318 is attached to the housing 310, the cover 318 is configured to press the cartridge 320 into the housing 310 and against the retainer 316. The cover 318 may be attached to the housing 310 by any suitable attachment structure. For example, the cover 318 may be threaded into the housing 310, or may include pins configured to mate with corresponding grooves formed in the housing 310. In the alternative, the cover 318 may be clamped to the housing 310, or may be hinged and clamped to the housing 310. The cover 318 may include a gasket configured to prevent a fuel from passing between the cover 318 and the housing 310.

The cartridge 320 may be configured to closely conform to the inner surface of the housing 310. For example, when the housing 310 is cylindrical, the cartridge 320 may have a corresponding cylindrical shape. According to some embodiments, the cartridge 320 may optionally include at least one end support 326.

The end support 326 may be a gasket configured to prevent fluid flowing between the cartridge 320 and the housing 310 (e.g., bypassing the cartridge 320). The end support 326 may be disposed on an end of the cartridge 320 adjacent to the cover 318. The end support 326 may structurally support the corresponding end of the cartridge 320 and/or may prevent fuel passing through the cover 318 from bypassing the cartridge 320. The end support 326 may be formed of rubber, plastic, metal, or similar non-permeable material. The end support 326 may be disposed on an outer surface of the cartridge 320, or may be disposed inside of the cartridge 320. The cartridge 320 may optionally include one or more handles 321 to facilitate movement thereof.

The cartridge 320 may include at least one side wall 322 and end walls 324. The sidewall 322 may be permeable or impermeable. When the sidewall 322 is impermeable, the end walls 324 may be gas permeable or may include gas permeable portions. For example, the end walls 324 may include gas permeable portion surrounded by an annular impermeable portion. For example, the sidewall 322 and a portion of the end walls 324 may be formed of a gas impermeable material such as plastic, rubber, silicone, metal or the like. In the alternative, the sidewall 322 may be formed of a gas permeable material, such as cloth, mesh, filter media, or the like. The cartridge 320 may be any rigid or flexible (e.g., non-rigid) vessel that can contain the sorbent material 325, such as a removable bag, box, or tube.

The cartridge 320 may optionally include at least one support 328. The support 328 may be configured to support the sidewall 322, such that fuel is prevented from bypassing the cartridge 320.

Figure 3B:
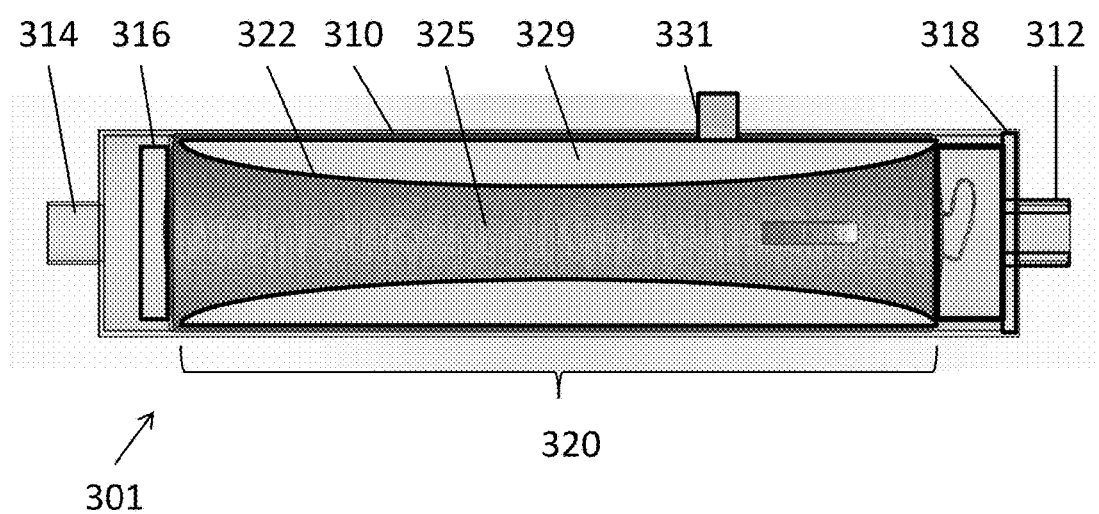

FIG. 3B is a plan view of a sorbent bed 301 according to various embodiments of the present disclosure. The sorbent bed 301 is similar to the sorbent bed 300, so only the differences therebetween will be discussed in detail.

Referring to FIG. 3B, the sorbent bed 301 includes a support 329 configured to apply pressure to the sidewall 328 of a flexible cartridge 320, such that a fluid, (e.g. a fuel), is prevented from flowing between the cartridge 320 and the housing 310 (e.g., bypassing the cartridge 320). The support 329 may be in the form of a bladder configured to be filled with a fluid, such as compressed air. In such a case, the support 329 may include an opening 331 (e.g., a valve or quick connect) configured to receive such a fluid. In the alternative, the support 329 may include a compression spring configured to apply pressure to the cartridge 320.

The support 329 may surround the cartridge 320, as shown in FIG. 3A. However, in other embodiments, the support 329 may be disposed on one or more sides of the cartridge 320.

According to some embodiments, a method of using the sorbent bed 301 may include opening the cover 318 and then inserting the cartridge 320 into the housing 310. During insertion, the support 329 may be in a substantially deflated configuration. After insertion, the cover 318 is closed and secured. The support 329 may then be inflated through the opening 331, such that the support 329 compresses the cartridge 320 and fills any space between the cartridge 320 and the housing 310. The support 329 may be deflated, prior to removing the cartridge 320 for replacement.

Figure 3C:
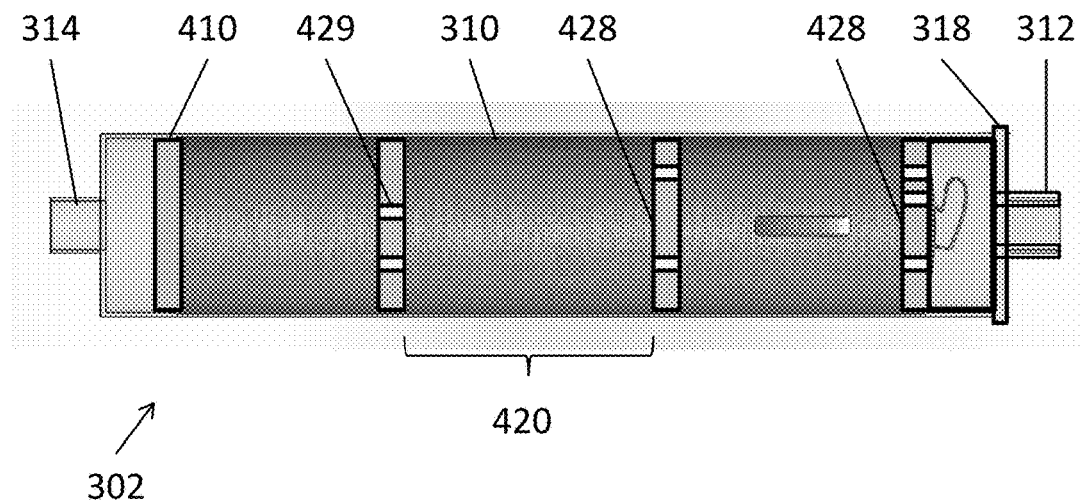

FIG. 3C is a top plan view of a sorbent bed 302 according to various embodiments of the present disclosure. The sorbent bed 302 is similar to the sorbent bed 300, so only the differences therebetween will be discussed in detail.

Referring to FIG. 3C, the sorbent bed 302 includes supports 428 and multiple removable cartridges 420. The supports 428 may be disposed between the cartridges 420. The cartridges 420 may include the same or different sorbent materials. Each support 428 may be in the form of a mesh, screen, or a solid plate having through-holes extending there through. In particular, the supports 428 may include through-holes configured to control fuel flow through the cartridges 420. The supports 428 may have particular arrangements of the through-holes 429, such that the supports 428 operate to redistribute fuel flow through the cartridges 420. The structure and function of the supports 428 may be further described below, with regard to the description of similar supports 328C shown in FIG. 4C.

Figure 3D:
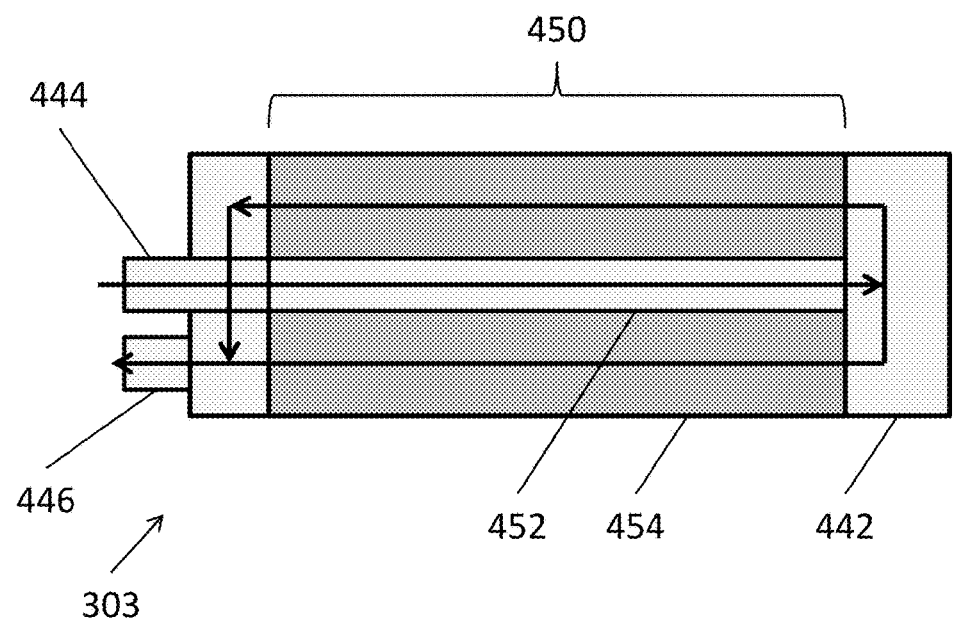

FIG. 3D is a top plan view of a sorbent bed 303 according to various embodiments of the present disclosure. The sorbent bed 303 is similar to the sorbent bed 300, so only the differences therebetween will be discussed in detail.

Referring to FIG. 3D, the sorbent bed 303 includes a housing 442, a first opening 444, a second opening 446, and a removable flexible cartridge 450. The first opening 444 may be an inlet configured to supply a fluid (e.g. fuel) to a flow conduit 452 formed in the cartridge 450. The flow conduit 452 may extend through the center of the cartridge 450. The flow conduit 452 may be formed of an impermeable material (e.g., may be impermeable). The fuel may apply pressure to the cartridge 450, while passing through the flow conduit 452, such that the cartridge 450 is biased against an inner surface of the housing 442. The fuel exiting the flow conduit 452 is directed by an end of the housing 442 back towards the cartridge 450. The fuel then travels through the cartridge 450, before exiting the housing 442 via the second opening 446, which may be an outlet. The flow conduit 452 may be formed of the same material as a sidewall 454 of the cartridge 450. Accordingly, the flow conduit 452 may be permeable or impermeable.

Figure 4A:
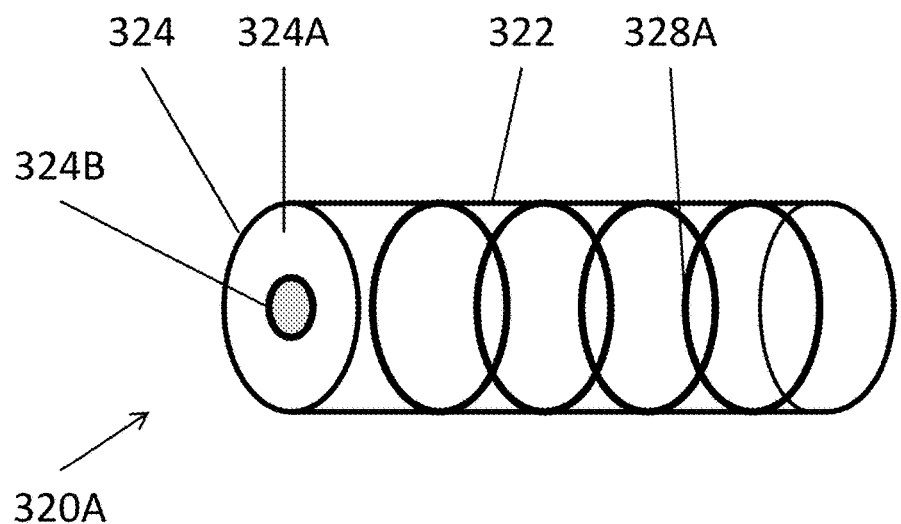
FIG. 4A-4D are perspective plan views of sorbent cartridges.

FIG. 4A is a schematic view of a cartridge 320A, according to various embodiments of the present disclosure. The cartridge 320A is similar to the cartridge 320, so only the differences therebetween will be described in detail.

Referring to FIG. 4A, the cartridge 320A includes rings 328A as an internal support configured to support the sidewall 322. The rings 328A may be more rigid than the sidewall 322. In particular, the rings 328A may be configured to bias the sidewall 322 against the housing 310. The end walls 324 of the cartridge 320 may include an impermeable portion 324A surrounding a permeable portion 324B.

Figure 4B:
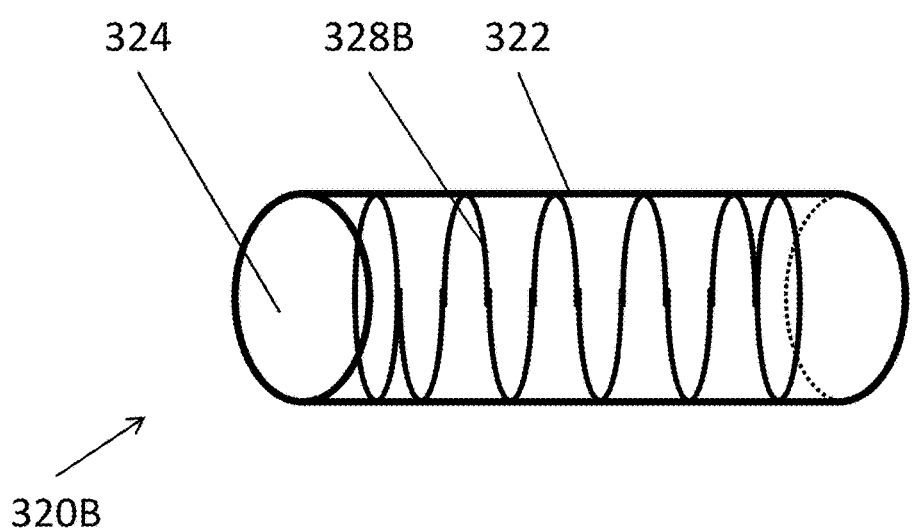

FIG. 4B is a schematic view of a cartridge 320B, according to various embodiments of the present disclosure. The cartridge 320B is similar to the cartridge 320, so only the differences therebetween will be described in detail.

Referring to FIG. 4B, the cartridge 320B includes a spring 328B as an internal support configured to support the sidewall 322. The spring 328B may be formed of any compressively resistant material, such as metal or plastic. In particular, the spring 328B may be configured to bias the sidewall 322 against the housing 310. However, in some embodiments, the spring 328 may be attached to the outer surface of the sidewall 322, or may be embedded in the sidewall 322.

Figure 4C:
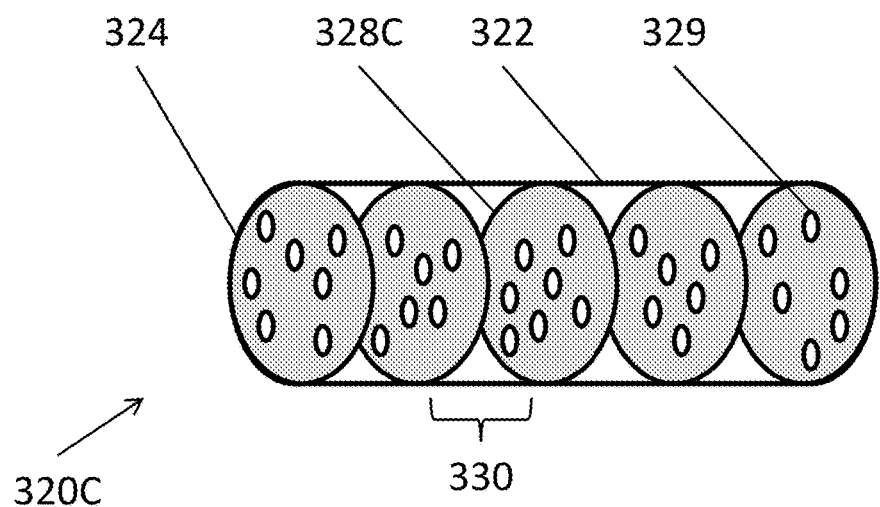

FIG. 4C is a schematic view of a cartridge 320C, according to various embodiments of the present disclosure. The cartridge 320C is similar to the cartridge 320, so only the differences therebetween will be described in detail.

Referring to FIG. 4C, the cartridge 320C includes supports 328C (e.g. plates) that may operate as an internal support configured to support the sidewall 322. The plates 328C may be permeable and may be disposed at the end walls 324 of the cartridge 320C and/or may be disposed in the cartridge 320C, so as to divide the cartridge into chambers 330. Each chamber 330 may include the same sorbent material, or one or more of the chambers 330 may include different sorbent materials.

The plates 328C may each be a solid plate having through-holes 329 extending there through. The through-holes 329 may be small enough to prevent sorbent material from passing there through. The through-holes 329 may be patterned to control the flow of fuel through the cartridge 320C. For example, the plates 328C may have different arrangements of the through-holes 329, such that the plates 328C redistribute fuel flow through the cartridge 320C. In other embodiments, the through-holes 329 may be clustered, such that some of the plates 328C have a higher through-hole density at the centers thereof, and other plates 328C have a higher through-hole density at edges thereof. In the alternative, the plates 328C may be in the form of a mesh, screen, or other fluid-permeable structure.

Figure 4D:
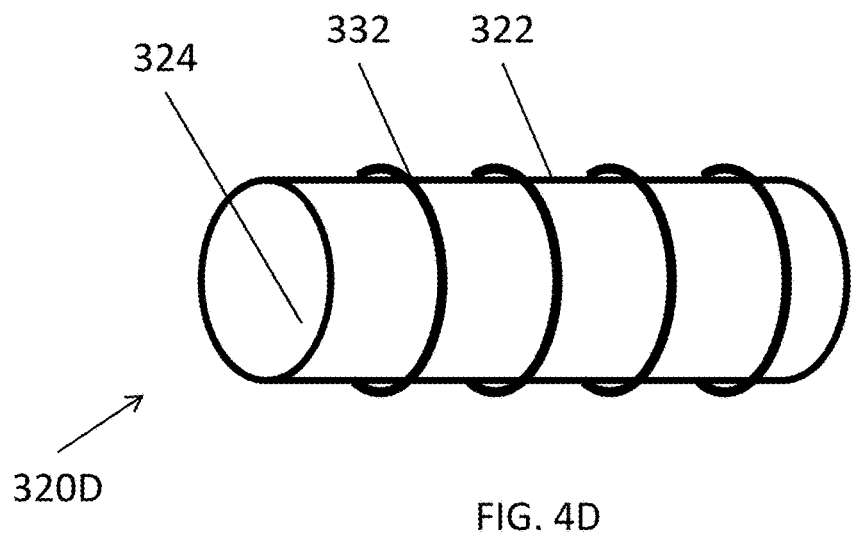

FIG. 4D is a perspective view of a cartridge 320D, according to various embodiments of the present disclosure. The cartridge 320D is similar to the cartridge 320, so only the differences therebetween will be described in detail.

Referring to FIG. 4D, the cartridge 320D includes supports 332 (e.g., external supports). The external supports 332 may be disposed on an outer surface of the sidewall 322 and may be configured to support the sidewall 322. The external supports 332 may be formed of any compressively resistant material, such as metal or plastic. In some embodiments, the external supports 332 may operate as gaskets to prevent fuel bypass of the cartridge 320D. In this case, the external supports 332 may be formed of rubber, silicon, plastic, or the like.

Figure 4E:
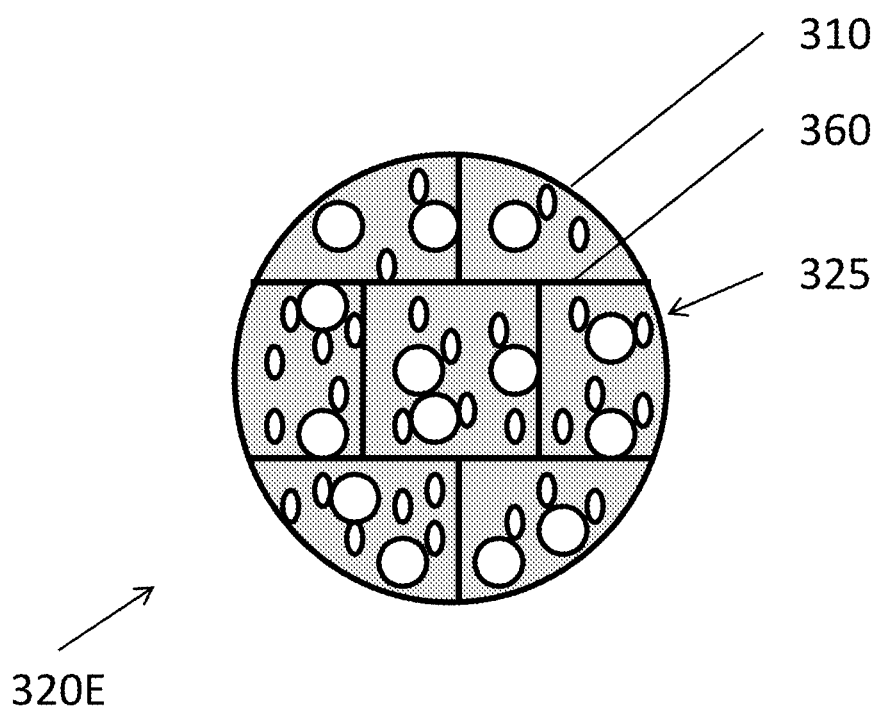
FIG. 4E is a sectional plan view of a sorbent cartridge, according to various embodiments of the present disclosure.

FIG. 4E is a sectional view of a cartridge 320E, according to various embodiments of the present disclosure. The cartridge 320D is similar to the cartridge 320, so only the differences therebetween will be described in detail.

Referring to FIG. 4E, the cartridge 320E includes a housing 310, and partitions 360 (e.g., internal walls) disposed in the housing 310 and configured to divide the housing 310 into chambers. For example, the partitions 360 may divide the housing 310 vertically and/or horizontally to form the chambers. Each of the chambers is filled with a sorbent material 325. The partitions 360 may be gas-permeable or impermeable. For example, the partitions 360 may be formed of a mesh, screen, or other permeable material. In some embodiments, the partitions 360 may be formed of the same material as a sidewall of the housing 310.

The sorbent material 325 may be in the form of particles. Due to the horizontal configuration of the cartridge 320E, it is beneficial for the particles to have a substantially uniform particle size distribution. Since the housing 310 is divided by the partitions 360 in a horizontal direction, the size segregation of the particles due to gravity may be reduced. In other words, the chambers prevent larger particles of the sorbent material 325 from congregating at the bottom of the cartridge 320E. As such, the partitions 360 may allow for the sorbent material 325 to include particles having a relatively larger particle size distribution.

According to various embodiments, the supports 326, 328, 328A, 328B, and 332 may be used together in any combination and may also be used with the partitions 360.

Figure 5:
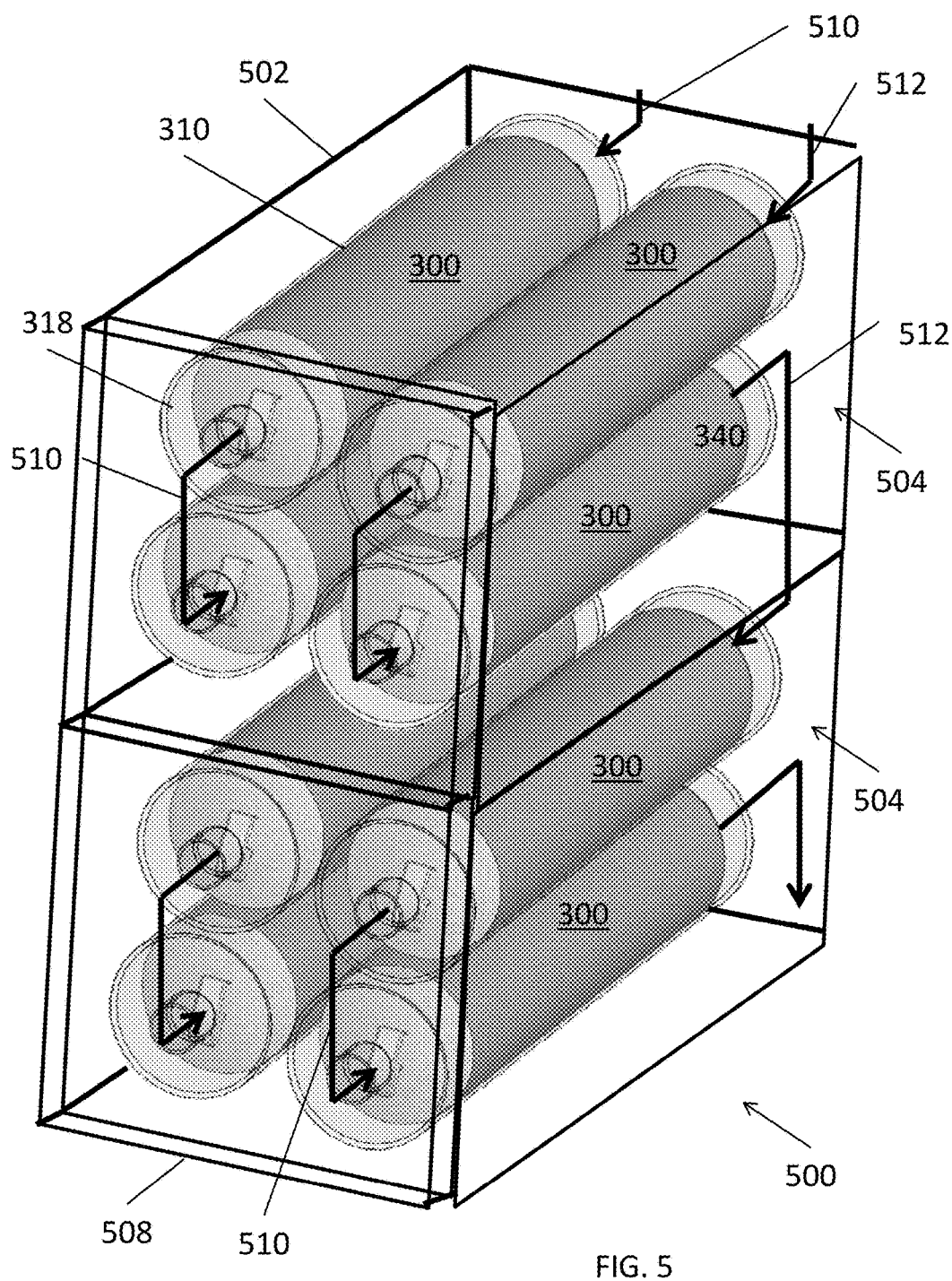
FIG. 5 is a perspective plan view of a sorbent bed assembly (SBA) according to various embodiments of the present disclosure.

FIG. 5 is a perspective view of a SBA 500, according to various embodiments of the present disclosure. The SBA 500 may be used as either or both of the SBAs 200, 202 described above. Referring to FIG. 5, the SBA 500 includes a cabinet 502 that is optionally divided into chambers 504. While two chambers 504 are shown, the SBA 500 is not limited to any particular number of chambers 504. Each chamber 504 includes a stack of multiple sorbent beds 300 and a door 508. The housings 310 of the sorbent beds 300 may be attached to one another and/or to the cabinet 502 by, for example, brazing or welding. Such attachment is possible since the sorbent material of the sorbent beds 300 may be replaced by removing and replacing the corresponding removable cartridges included therein. In some embodiments, the sorbent beds 300 may include the same or different types of sorbent material. The sorbent beds 300 may be aligned such that the covers 318 may be accessed from the same side of the SBA 500. While the sorbent beds 300 are shown, any of the sorbent beds discloses herein may be included in the SBA 500.

The SBA 500 may include plumbing to fluidly connect the sorbent beds 300. For example, the SBA 500 may include first conduits 510 and second conduits 512. The first conduits 510 may be configured to connect the sorbent beds 300 in each chamber 504, (e.g., may connect vertically adjacent sorbent beds 300 of the same chamber 504). The second conduits 512 may connect sorbent beds 300 of adjacent chambers 504 (e.g., may connect vertically adjacent sorbent beds 300 of adjacent chambers 504.

Accordingly, the sorbent beds 300 on the left side of the SBA 500 may be fluidly connected in series, and the sorbent beds 300 on the right side of the SBA 500 may be fluidly connected in series. Therefore, the left side sorbent beds 300 may operate as the first SBA 200, and the right side sorbent beds 300 may operate as the second SBA 202. However, the present disclosure is not limited to any particular connection configuration. For example, the sorbent beds 300 of each chamber could be fluidly connected in series, such that each chamber may operate as a separate SBA.

According to some embodiments, the first conduits 510 may be incorporated into the doors 508, and may include sealing elements (e.g., gaskets or the like) configured to mate with and/or seal openings of the sorbent beds 300. As such, when a door 508 is opened, the corresponding first conduits 510 may be disconnected from the corresponding sorbent beds 300, such that the sorbent beds 300 may be easily accessed.

Figure 6A:
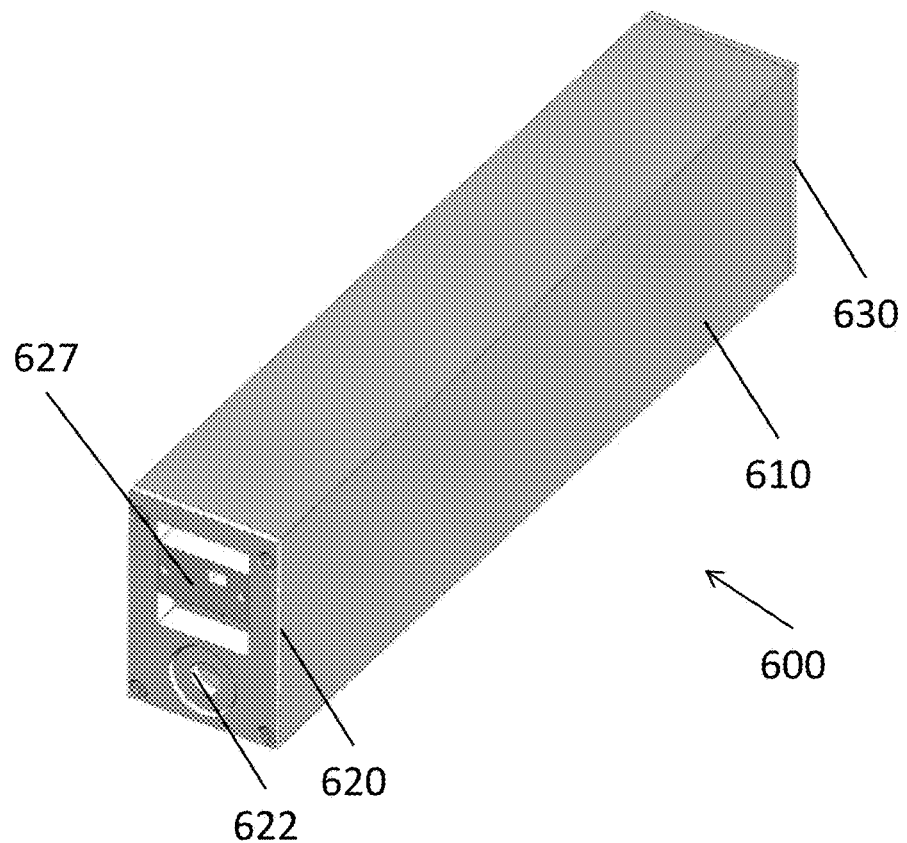
FIG. 6A is a perspective view of a sorbent cartridge.
Figure 6B:
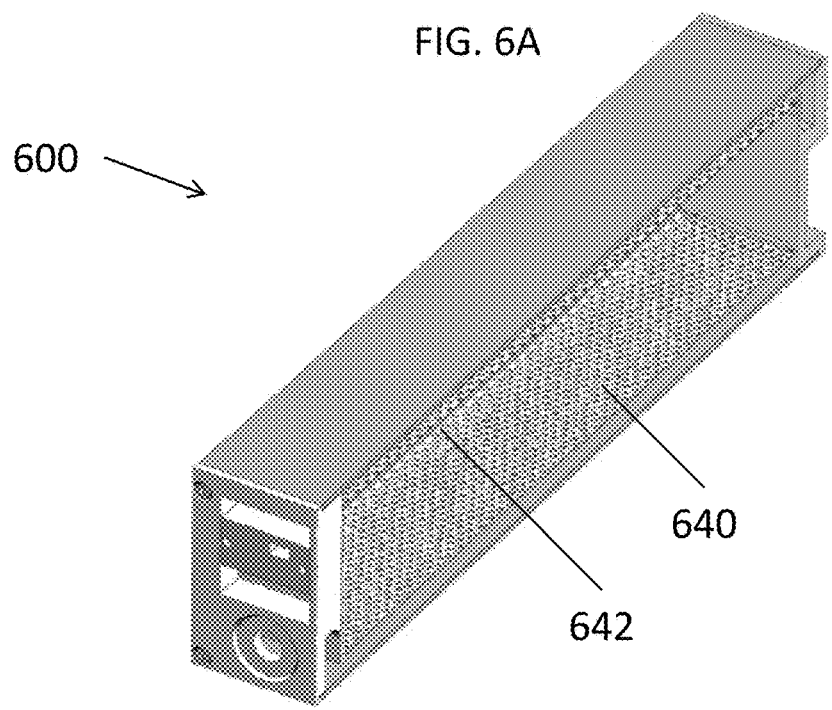
FIG. 6B is a sectional perspective view of the sorbent cartridge.

FIG. 6A is a perspective view of a sorbent bed cartridge 600 according to various embodiments of the present disclosure. FIG. 6B is a sectional perspective view of the cartridge 600, and FIG. 6C is a sectional view showing a flow path through of the cartridge 600.

Figure 6C:
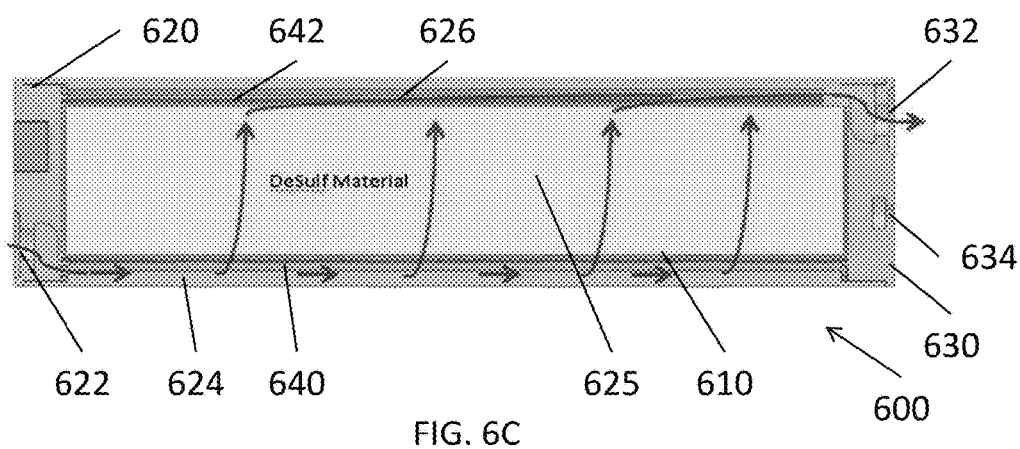
FIG. 6C is a side sectional view of the sorbent cartridge, according to various embodiments of the present disclosure.

Referring to FIGS. 6A-6C, the cartridge 600 includes a housing 610, a first cover 620, a second cover 630, a first screen 640, and a second screen 642. Herein, the cartridge may operate and/or be referred to as a sorbent bed. The cartridge 600 may be shaped as a rectangular prism. The first and second screens 640, 642 are intended to encompass any type of porous structure capable of retaining a particulate sorbent material while permitting fuel to flow there through.

The first cover 620 includes a first opening 622 (e.g., inlet) and an indicator 627. The second cover 630 includes a second opening 632 (e.g. outlet) and a connection point 634. The housing 610 is configured to house a sorbent material 625 (e.g. desulfurization material), as described above. The indicator 627 may be configured to identify whether the sorbent material 625 has been exhausted.

The cartridge 600 is configured such that a fluid (e.g. a fuel) may be received through the first opening 622 and is then provided to a first channel 624 (e.g., lower channel) at least partially defined by the housing 610 and the first screen 640. The first channel 624 ends at the second cover 630 (e.g., the second cover 630 acts as a stopper preventing further lateral fuel flow in the cartridge 600). As such, the fuel in the first channel 624 flows through the first screen 640 and into the sorbent material 625 (e.g., in a substantially vertical direction). Then the fuel passes through the second screen 642 and into a second channel 626 (e.g., upper channel) at least partially defined by the second screen 642 and the housing 610. From the second channel 626, the fuel exits the cartridge via the second opening 632. However, according to some embodiments, the fuel flow path may be reversed, such that the fuel flows through the sorbent material 625 from top to bottom, or from side to side, rather than from bottom to top, as shown. Accordingly, in contrast to conventional desulfurization beds, the cartridge 600 may be configured to purify a fuel while being oriented lengthwise in a non-vertical vertical direction (e.g., substantially a horizontal direction. In other words, the major axis of the cartridge 600 may extend at an angle ranging from about 0° to about 45° with respect to horizontal/the ground.

According to some embodiments, the first cover 620 and/or the second cover 630 may be removable. As such, the sorbent material 625 may be accessed and replaced, allowing for reuse of the cartridge 600.

Figure 7:
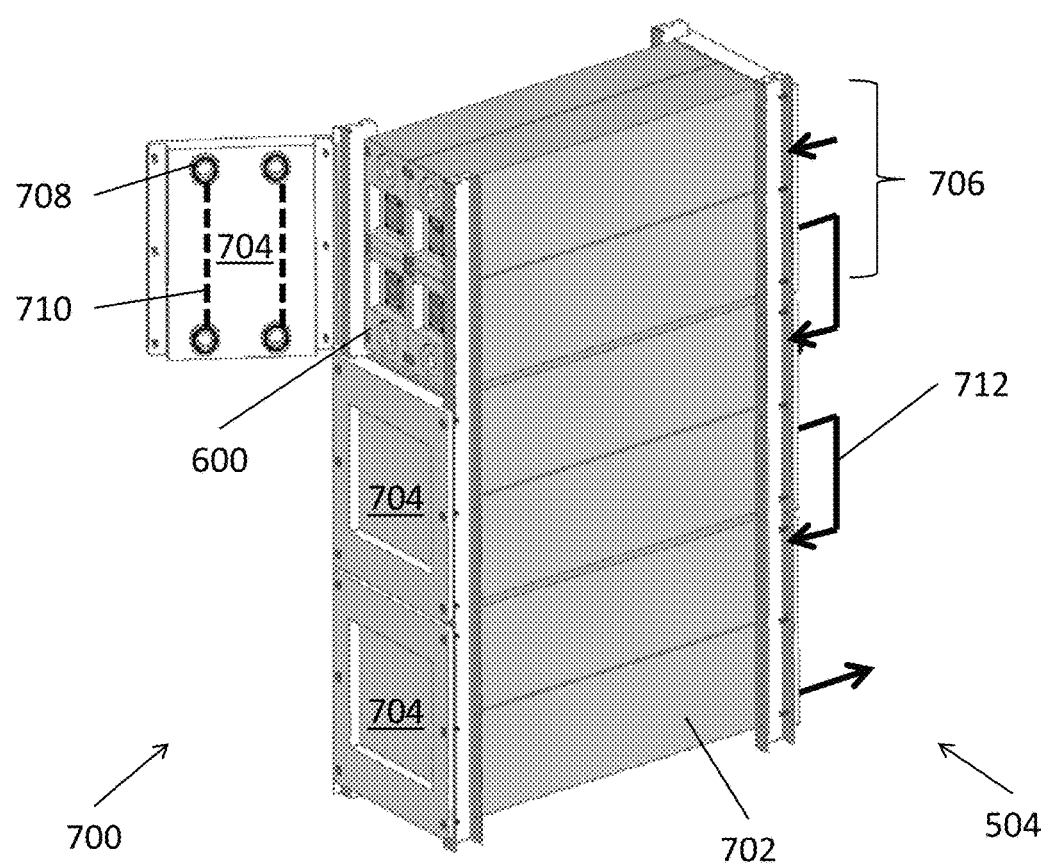
FIG. 7 is a perspective view of a SBA according to various embodiments of the present disclosure.

FIG. 7 is a perspective view of a SBA 700, according to various embodiments of the present disclosure. Referring to FIG. 7, the SBA 700 includes a cabinet 702 configured to receive cartridges 600. In particular, the cabinet 702 may include rails or shelves configured to receive the cartridges 600. The cabinet 702 may include several chambers 706 housing a number of cartridges 600, and a door 704 to cover/seal each chamber 706.

Each door 704 may include gaskets 708 with openings configured to mate with a first opening 622 of a corresponding cartridge 600. The gaskets 708 may be connected by door conduits 710. As such, the doors 704 may be configured to fluidly connect the cartridges 600. The SBA 700 may also include conduits 712 configured to fluidly connect the second openings 632 of the cartridges 600. Accordingly, the SBA 700 may have any of the flow configurations as described above with regard to the SBA 500. The SBA 700 and/or the SBA 500 may be used as one or both of the SBAs 200, 202 of the fuel processor 100.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A fuel processor of a fuel cell system, comprising:
   a first sorbent bed assembly (SBA);
   a second SBA assembly;
   a first four-way valve fluidly connected to a fuel source;
   a second four-way valve fluidly connected to a fuel cell of the fuel cell system; and
   conduits configured to fluidly connect the first and second sorbent beds and the first and second valves, wherein:
   when the first valve is in a first position and the second valve is in a first position, the fuel flows through the first valve, the first SBA, the second valve, the first valve, the second SBA, and then to the fuel cell;
   when the first valve is in a second position and the second valve is in a second position, the fuel flows through the first valve, the second SBA, the second valve, the first valve, the first SBA, the second valve, and then to the fuel cell;
   when the first valve is in the second position and the second valve is in the first position, the fuel flows through the first valve, the second SBA, the second valve, and then to the fuel cell, without passing through the first SBA; and
   when the first valve is in the first position and the second valve is in the second position, the fuel flows through the first valve, the first SBA, the second valve, and then to the fuel cell, without passing through the second SBA.

2. The fuel processor of claim 1, wherein the conduits comprise:
   a valve conduit fluidly connecting the first and second valves;
   a fuel source conduit fluidly connecting the first valve to a fuel source;
   a stack conduit fluidly connecting the second valve to the fuel cell;
   a first inlet conduit fluidly connecting the first valve and the first SBA;
   a first outlet conduit fluidly connecting the first SBA and the second valve;
   a second inlet conduit fluidly connecting the first valve and the second SBA; and
   a second outlet conduit fluidly connecting the second SBA and the first valve.

3. The fuel processor of claim 2, further comprising one or more of:
   a system purge valve disposed in fluid communication with the fuel source conduit;
   a first purge valve disposed in fluid communication with the first outlet conduit; and
   a second purge valve disposed in fluid communication with the second outlet conduit.

4. The fuel processor of claim 1, wherein:
   the first and second SBAs each comprise sorbent beds configured to purify a fuel, the sorbent beds being disposed in a stack, such that the sorbent beds extend lengthwise, in a non-vertical direction; and
   one or more of the sorbent beds comprise:
   a housing;
   a removable cartridge disposed in the housing and comprising a sorbent material configured to purify the fuel; and
   a support configured to prevent the fuel from bypassing the cartridge when the fuel flows through the housing.

* * * * *